(12) United States Patent
Ohke

(10) Patent No.: US 6,269,713 B1
(45) Date of Patent: Aug. 7, 2001

(54) VEHICLE WITH AUXILIARY TRAVELING DEVICE

(75) Inventor: Osamu Ohke, 10-6-4, Asakuranishimachi 2-chome, Kochi-shi, Kochi (JP)

(73) Assignees: Projet Company Limited; Osamu Ohke, both of Kochi (JP)

( * ) Notice: Subject to any disclaimer, the term of this patent is extended or adjusted under 35 U.S.C. 154(b) by 0 days.

(21) Appl. No.: 09/410,090

(22) Filed: Oct. 1, 1999

(30) Foreign Application Priority Data

Oct. 2, 1998 (JP) .................................................. 10-281693

(51) Int. Cl.$^7$ .................................................. F16H 47/00
(52) U.S. Cl. ............................................ 74/733.1; 475/78
(58) Field of Search ...................... 475/72, 78; 74/732.1, 74/733.1

(56) References Cited

U.S. PATENT DOCUMENTS

| | | | |
|---|---|---|---|
| 3,779,608 | * | 12/1973 | Hatcher et al. ........................ 299/39 |
| 4,441,573 | * | 4/1984 | Carman et al. ....................... 180/165 |
| 4,566,279 | * | 1/1986 | Kronogard et al. ................ 475/10 X |
| 5,052,986 | * | 10/1991 | Jarchow et al. ..................... 475/72 X |
| 5,165,139 | * | 11/1992 | Oxman .................................. 15/321 |
| 6,044,728 | * | 4/2000 | Pecceu ............................ 74/733.1 X |
| 6,082,630 | * | 7/2000 | Bohrer ................................. 239/127 |

* cited by examiner

*Primary Examiner*—Sherry Estremsky
(74) *Attorney, Agent, or Firm*—Sughrue, Mion, Zinn, Macpeak & Seas, PLLC

(57) ABSTRACT

A vehicle which can achieve high speed traveling performance as achieved by a normal vehicle, and which can be continuously driven at inching speed with a traveling prime mover of high revolution speed and high output. The vehicle includes a power train including a primary power transmission for normal traveling, which is connected to a prime mover for normal traveling, for transmitting a rotational torque of the traveling prime mover to driving wheels, through a rotary power transmission shaft, a drive shaft speed reducer and drive shaft, an external power takeoff mechanism incorporated in the primary power transmission, a hydraulic pressure generator connected to an external power takeoff shaft of the external power takeoff mechanism, and a hydraulically controlled power transmission for traveling at inching speed, which includes a hydraulic motor connected to the hydraulic pressure generator. When the primary power transmission for normal traveling is shifted out of the neutral range position, the external power takeoff mechanism and the hydraulically controlled power transmission for traveling at inching speed being made inoperative instantly in response to an electrical signal from a neutral position detector incorporated in said primary power transmission for normal traveling.

9 Claims, 5 Drawing Sheets

VEHICLE WITH AUXILIARY TRAVELING DEVICE

BACKGROUND OF THE INVENTION

1. Field of the Invention

The present invention relates to a vehicle with an auxiliary traveling device.

2. Description of the Related Art

Normal vehicle may run at a high speed higher than or equal to 100 km/h. However, it is typical that the vehicle is not provided a primary power transmission having a power transmission ratio permitting to run at inching speed in the extent lower than 5 km/h when a prime mover for traveling is a high revolution speed and high output.

Accordingly, in case of a vehicle specialized for parade or a working vehicle which is required inching with a traveling prime mover of high revolution speed and high output, a power transmission which has different power transmission ratio other than that of a power transmission of the normal vehicle has to be installed. On the other hand, the vehicle having such power transmission other than the power transmission of the normal vehicle, normally does not have performance for high speed traveling unless it is a special vehicle which has a power transmission with sixteen stages of speed ratio, or so forth. Therefore, such vehicle has to be transported to a destination by a transporter or the like.

On the other hand, the normal vehicle installed with an external power takeoff cannot simultaneously drive the external power takeoff during normal traveling by the primary prime mover or simultaneously drive the vehicle for normal traveling by the primary prime mover while the external power takeoff is in operation, forcedly.

Various working vehicles, such as so-called vacuum type suction cleaner vehicle, may travel to a destination, namely a working site, at high speed similarly to the normal vehicle. However, such working vehicle is not able to run at inching speed required for cleaning operation while predetermined suction cleaning operation is performed using the external power takeoff at the working site.

Accordingly, when it is required to drive the vehicle at inching speed during suction cleaning operation, it is inherent to install a dedicated prime mover separately from the traveling prime mover for using as driving source in suction cleaning operation.

However, in practice, a special vehicle in which is installed a multi-speed power transmission permitting continuous traveling at inching speed in the extent lower than 5 km/h is installed, and also achieving normal high speed traveling performance, with the traveling prime mover of high revolution speed and high output, is quite expensive.

On the other hand, installation of the prime mover dedicated for inching travel, namely the working prime mover separately from the traveling prime mover inherently increase production cost and is disadvantageous in viewpoint of weight and installation space.

SUMMARY OF THE INVENTION

The present invention has been worked out in view of drawbacks in the prior art as set forth above. Therefore, it is an object of the present invention to provide a vehicle which can achieve high speed traveling performance as achieved by a normal vehicle, and can be continuously driven at inching speed in the extent of lower than 5 km/h with a traveling prime mover of high revolution speed and high output at a destination.

According to the first aspect of the present invention, a vehicle with an auxiliary traveling device comprises:

a power train including a primary power transmission for normal traveling, which is connected to a prime mover for normal traveling, for transmitting a rotational torque of the traveling prime mover to driving wheels, through a rotary power transmission shaft, a drive shaft speed reducer and drive shaft;

an external power takeoff mechanism incorporated in the primary power transmission;

a hydraulic pressure generator connected to an external power takeoff shaft of the external power takeoff mechanism;

a hydraulically controlled power transmission for inching travel, which includes a hydraulic motor connected to the hydraulic pressure generator;

the power train being active for enabling the vehicle to travel at a normal traveling speed while the primary power transmission for normal traveling is placed at a range position other than neutral range position, the auxiliary traveling device being operated for enabling travel at inching speed when the primary power transmission for normal traveling is placed at neutral range position, and when the primary power transmission for normal traveling is shifted out of the neutral range position, the external power takeoff mechanism and the hydraulically controlled power transmission for inching travel being made inoperative instantly in response to an electrical signal from a neutral position detector incorporated in the primary power transmission for normal traveling.

According to the second aspect of the present invention, a vehicle with an auxiliary traveling device which travels at a normal traveling speed by transmitting a rotational torque of a traveling prime mover to driving wheels via a rotary power transmission shaft, a drive shaft speed reducer and a drive shaft while a normal traveling primary power transmission is in a range other than a neutral range, and performs a required work by transmitting the rotational torque of the traveling prime mover to an external work implement via an external power takeoff mechanism when the normal traveling primary power transmission is in the neutral range, comprises:

the auxiliary traveling device being formed by connecting a hydraulic pressure generator to an external power takeoff shaft of the external power takeoff mechanism to be driven by the rotational torque of the traveling prime mover, and connecting a hydraulically controlled power transmission for inching travel to the rotary power transmission shaft, the hydraulically controlled power transmission for inching travel incorporating a hydraulic motor connected to the hydraulic pressure generator;

the auxiliary traveling device being operated for enabling travel at inching speed in conjunction with operation of the external work implement when the primary power transmission for normal traveling is placed at neutral range position, and when the primary power transmission for normal traveling is shifted out of the neutral range position, the external power takeoff mechanism and the hydraulically controlled power transmission for traveling at inching speed being made inoperative instantly in response to an electrical signal from a neutral position detector incorporated in the primary power transmission for normal traveling.

According to the third aspect of the present invention, the vehicle with an auxiliary traveling device comprises:

a power train mechanism driving the vehicle to travel at a normal traveling speed by transmitting a rotational torque of a traveling prime mover to driving wheels via a rotary power transmission shaft, a drive shaft speed reducer and a drive shaft while a normal traveling primary power transmission is in a range other than a neutral range, and to transmit a rotational torque of the traveling prime mover to an external work implement via an external power takeoff mechanism for implementing a required work when the normal traveling primary power transmission is in the neutral range;

the auxiliary traveling device being formed by connecting a hydraulic pressure generator to an external power takeoff shaft of the external power takeoff mechanism to be driven by the rotational torque of the traveling prime mover, and connecting a hydraulically controlled power transmission for traveling at inching speed to the rotary power transmission shaft, the hydraulically controlled power transmission for traveling at inching speed incorporating a hydraulic motor connected to the hydraulic pressure generator;

the auxiliary traveling device being operated for enabling travel at inching speed in conjunction with operation of the external work implement when the primary power transmission for normal traveling is placed at neutral range position, and when the primary power transmission for normal traveling is shifted out of the neutral range position, the external power takeoff mechanism and the hydraulically controlled power transmission for traveling at inching speed being made inoperative instantly in response to an electrical signal from a neutral position detector incorporated in the primary power transmission for normal traveling.

In the construction set forth above, it is preferred that the hydraulically controlled power transmission for traveling at inching speed is constructed by extending a rotational power transmission shaft through a hydraulic vessel, on which the hydraulic motor is externally installed, connecting a first rotary power transmission shaft and a second rotary power transmission shaft with the rotary power transmission shaft at both ends, and assembling a connecting and disconnecting device for traveling at inching speed constituted of a first drive disc supported on the rotary power transmission shaft for free rotation with respect to the rotary power transmission shaft and a second drive disc fixed on the rotary power transmission shaft and operated for establishing and releasing connection by electrical signal or pneumatic pressure from a vehicular cabin.

In the preferred construction, control for connecting and disconnecting of the first and second drive discs in the connecting and disconnecting device for traveling at inching speed is performed by an electrical signal from the vehicular cabin, and in response to shifting of the primary power transmission for normal traveling to the position other than the neutral range position during operation of the external power takeoff, the external power takeoff and the connecting and disconnecting device for traveling at inching speed inoperative position in response to an electrical signal from the neutral position detector incorporated in the primary power transmission for normal traveling, instantly.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

One embodiment of a vehicle with an auxiliary traveling device according to the present invention will be discussed hereinafter in detail in terms of a vacuum type suction cleaning vehicle in which an external power takeoff is installed and is designed for continuously collecting particulate substance such as sand or the like, leaf-like matter such as fallen leaves, and paper waste and forth residing on a road surface.

Figure 1:
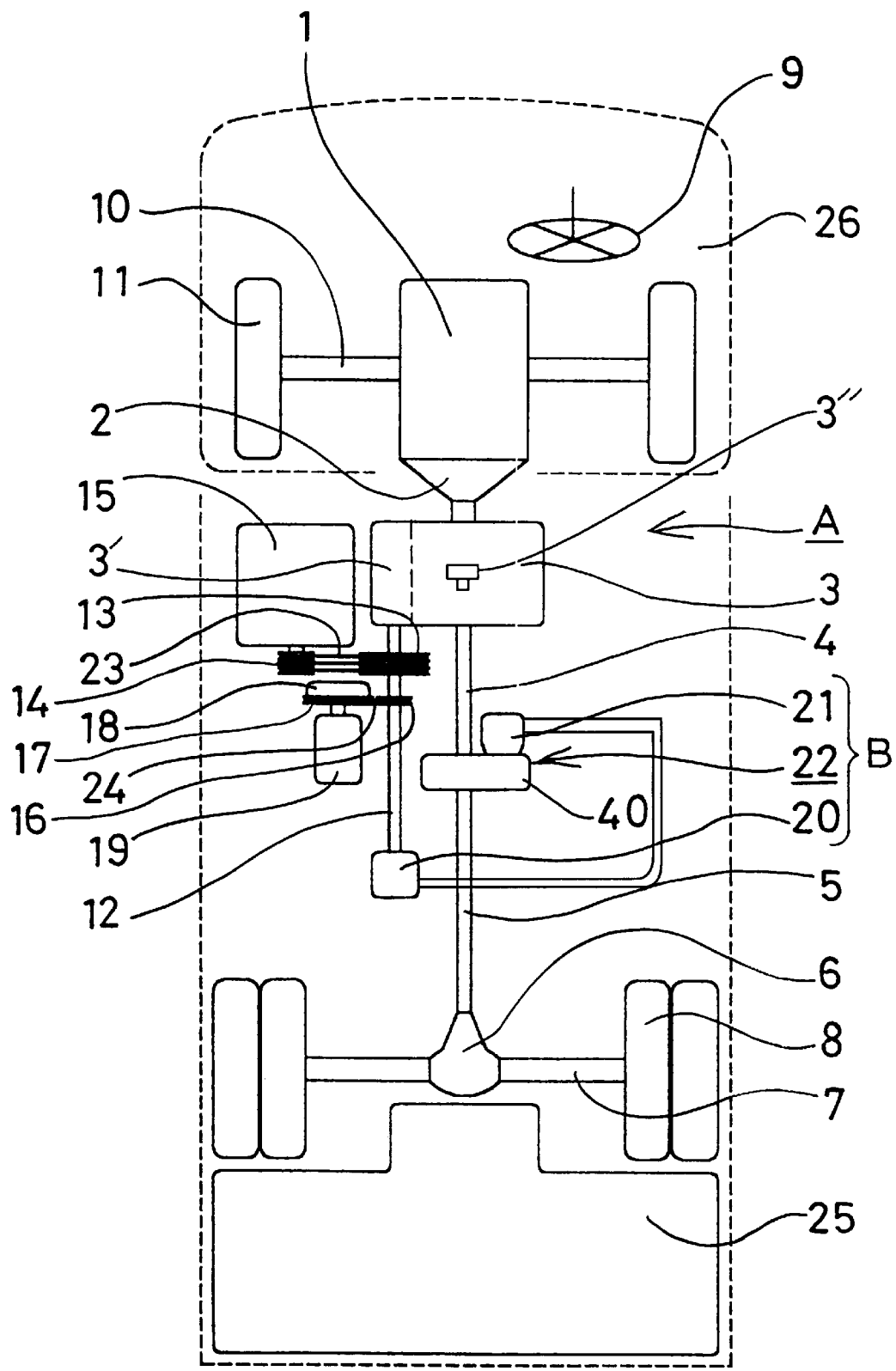
FIG. 1 is a general plan view showing a power transmission mechanism of a vacuum type suction cleaning vehicle as one embodiment of a vehicle with an auxiliary traveling device according to the present invention.

FIG. 1 generally shows a construction of a power transmission mechanism A of the construction discussed below.

The reference numeral 1 denotes a traveling prime mover, i.e. an internal combustion engine, 2 denotes a connecting and disconnecting device, i.e. a clutch, 3 denotes a primary power transmission for normal traveling provided with an external power takeoff (PTO) 3', 4 denotes a rotary power transmission A shaft (propeller shaft), 5 denotes a rotary power transmission B shaft (propeller shaft), 6 denotes a drive shaft speed reducer (differential gear box), 7 denotes a drive shaft, 8 denotes driving wheels, 9 denotes a steering wheel (handle) provided within a vehicular cabin 26, 10 denotes a wheel shaft and 11 denotes driven wheels.

The reference numeral 12 denotes an external power takeoff shaft of the external power takeoff mechanism 3', 15 denotes a vacuum generating device forming a vacuum suction mechanism which will be discussed later. The external power takeoff shaft 12 and the vacuum generating device 15 are mechanically linked by V-pulleys 13 and 14 and a V-belt 23.

The reference numeral 19 denotes a high water pressure generating device. The high water pressure generating device 19 and the external power takeoff shaft 12 are mechanically linked by V-pulleys 16 and 17, a V-belt 24 and a connecting and disconnecting device (clutch) 18 for the high water pressure generating device.

The reference numeral 20 denotes a hydraulic pump serving as a hydraulic pressure generator, connected to the external power takeoff shaft 12, 21 denotes a hydraulic motor driven by introducing a hydraulic pressure generated by the hydraulic pump 20, 22 denotes a hydraulically controlled power transmission for traveling at inching speed mechanically linking the rotary power transmission A shaft 4 and the rotary power transmission B shaft 5, and including the hydraulic motor 21. The hydraulic pump 20, the hydraulic motor 21 and the hydraulically controlled power transmission 22 for traveling at inching speed form an auxiliary traveling device B.

Figure 2:
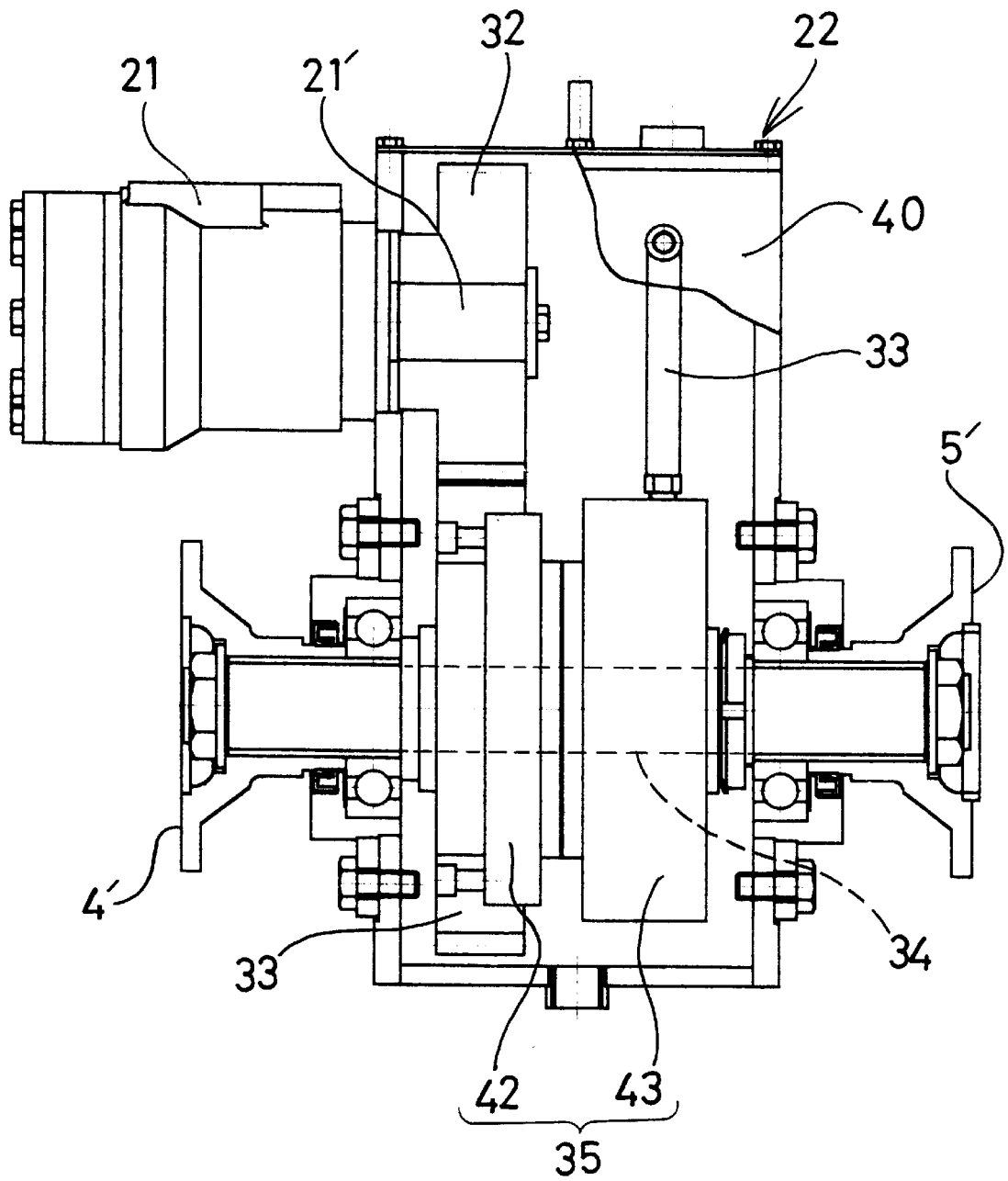
FIG. 2 is a side elevation showing inside of a hydraulically controlled power transmission of the vehicle with the auxiliary traveling device.
Figure 3:
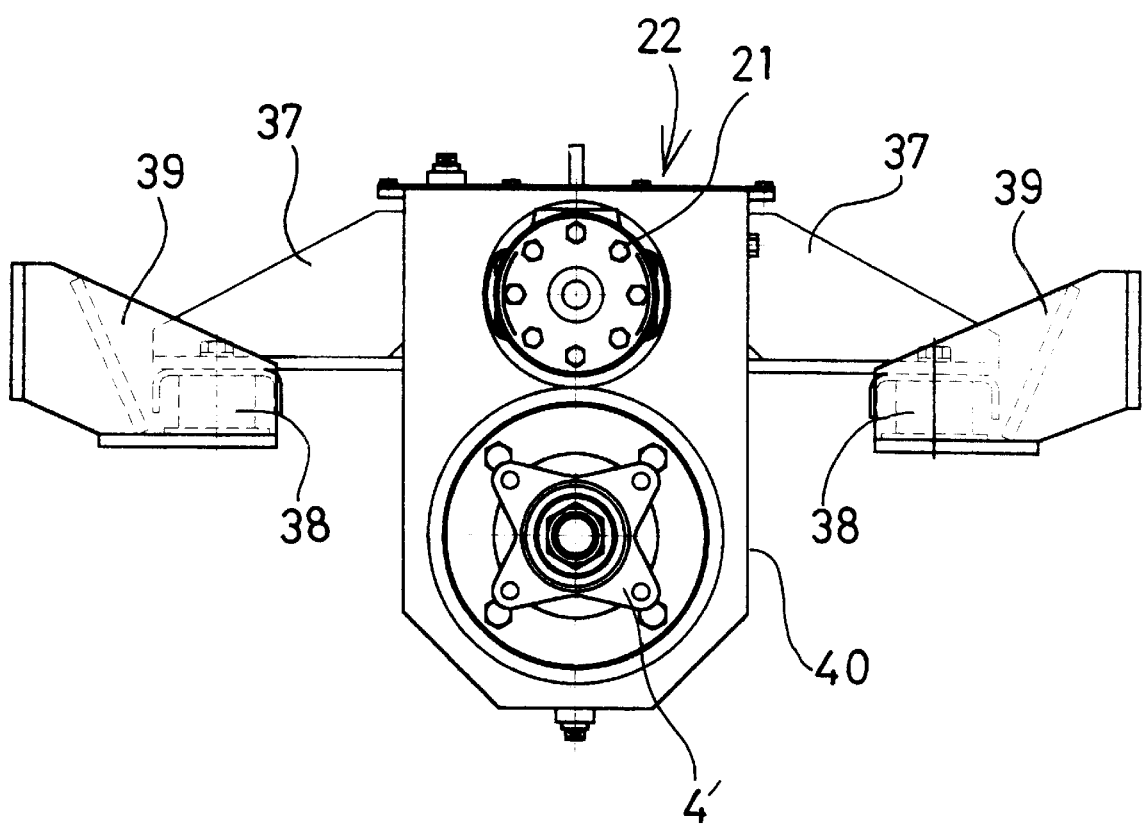
FIG. 3 is a front elevation showing inside of a hydraulically controlled power transmission of the vehicle with the auxiliary traveling device.
Figure 4:
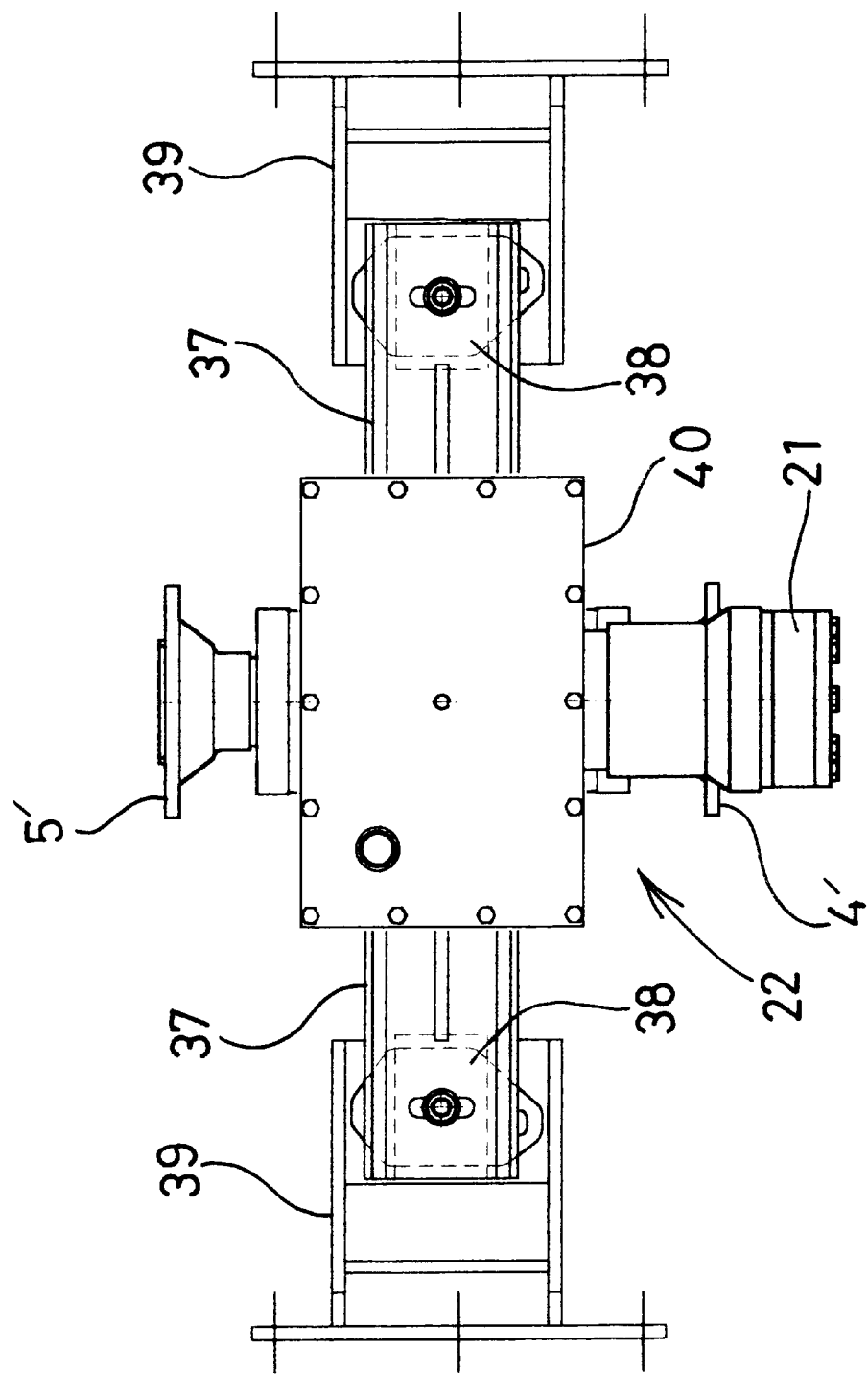
FIG. 4 is a plan view showing inside of a hydraulically controlled power transmission of the vehicle with the auxiliary traveling device.

As shown in FIGS. 2 to 4, the hydraulically controlled power transmission 22 for traveling at inching speed in the auxiliary traveling device B is constructed by extending a rotary power transmission shaft 34 through a hydraulic vessel 40, on which the hydraulic motor 21 is externally installed, connecting the rotary power transmission A shaft 4 and the rotary power transmission B shaft 5 with the rotary power transmission shaft 34 at both ends via universal joints 4' and 5', and assembling a connecting and disconnecting device (clutch) 35 for traveling at inching speed constituted of a drive disc 42 supported on the rotary power transmission shaft 34 for free rotation with respect to the rotary power transmission shaft 34 and a drive disc 43 fixed on the rotary power transmission shaft 34 and operated for establishing and releasing connection by electrical operation or by pneumatic pressure in response to an electrical signal from a vehicular cabin 26.

The drive disc 42 is linked with the hydraulic motor 21 via a rotary power transmission driven gear 33 arranged integrally with the drive disc 42 and a rotary power transmission primary gear 32 fixed on an output shaft 21' of the hydraulic motor 21.

The hydraulically controlled power transmission 22 for traveling at inching speed, constructed as set forth above, is mounted at a predetermined position on a chassis by a mounting beams 37, mounting members 38 and mounting brackets 39.

It should be noted that the reference numeral 33 in FIG. 2 denotes a hose serves for preventing drag.

The vacuum suction mechanism is constructed with the vacuum generating device 15 driven by revolution of the traveling prime mover 1 via the connecting and disconnecting device 2, the external power takeoff mechanism 3' provided on the primary power transmission 3 for normal traveling, the external power takeoff shaft 12, V-pulleys 13 and 14 and the V-belt 23, a collection vessel 65 connected to a vacuum piping 62 and a suction piping 62' of cylindrical shape for withstanding against a vacuum force, a dust catcher 63, a vacuum relief valve 64, a cleaning mouth 25 utilizing a high pressure water and compressed air, and so on. Furthermore, the collection vessel 65 can be lifted the front portion thereof about a fulcrum at the rear end by means of a hydraulic cylinder 66. A rear end of the collection vessel 65 is opened and closed by a door which is operated by a hydraulic cylinder 67.

Figure 5:
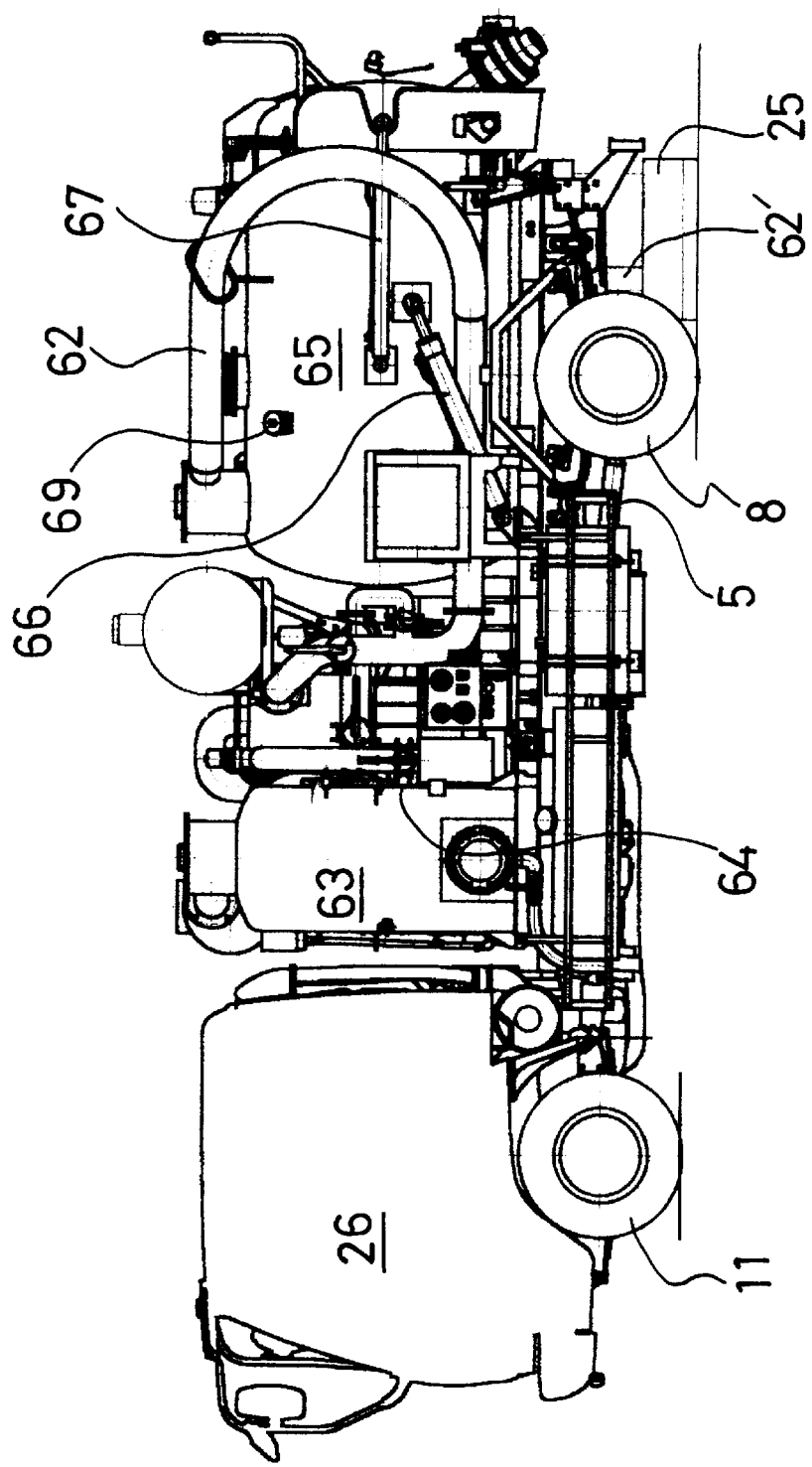
FIG. 5 is a side elevation of the vacuum type suction cleaning vehicle.

It should be noted that the reference numeral 69 in FIG. 5 is a water level detector.

The vacuum type suction cleaning vehicle constructed as set forth above maintains the external power takeoff mechanism 3' and the connecting and disconnecting device 35 for traveling at inching speed inoperative during high speed normal traveling to the destination. The driving wheels 8 of the vacuum type suction cleaning vehicle is rotatingly driven by the traveling prime mover 1, the connecting and disconnecting device 2, the primary power transmission 3 for normal traveling, the rotary power transmission A shaft 4, the rotary power transmission B shaft 5, the drive shaft speed reducer 6, and the drive shaft 7 for driving the vehicle in forward and reverse directions. Orientation of the driven (front) wheels 11 are controlled by the steering wheel 9 in the vehicular cabin 26 for controlling traveling direction of the vehicle.

At this time, the connecting and disconnecting device 35 for traveling at inching speed assembled in the hydraulically controlled power transmission 22 for traveling at inching speed is maintained inoperative as set forth above. The rotary power transmission driven gear 33 of the drive disc 42 will never be driven to rotate by the rotary power transmission primary gear 32.

During cleaning operation with inching travel of the vehicle, the connecting and disconnecting device 35 for traveling at inching speed is made operative. In conjunction therewith, the primary power transmission 3 for normal traveling is placed at neutral range position At this position, the hydraulic pump 20 is driven by the traveling prime mover 1 via the external power takeoff mechanism 3' and the external power takeoff shaft 12. Then, by introducing the hydraulic pressure generated by the hydraulic pump 20, the hydraulic motor 21 is driven to rotatingly drive the rotary power transmission shaft 34. According to rotation of the rotary power transmission shaft 34, the rotary power transmission A shaft 4 as well as the rotary power transmission B shaft 5 are rotated to rotatingly drive the drive shaft speed reducer 6, the drive shaft 7 and the wheels 8 for traveling in forward and reverse directions at the inching speed. Similarly to that upon normal traveling, orientation of the driven (front) wheels 11 are controlled by the steering wheel 9 in the vehicular cabin 26 for controlling traveling direction of the vehicle.

In the foregoing, control for connecting and disconnecting of the drive discs 42 and 43 in the connecting and disconnecting device 35 for traveling at inching speed is performed by the electrical signal from the vehicular cabin 26. If the primary power transmission 3 for normal traveling is unwantedly shifted to the position other than the neutral range position during operation of the external power takeoff mechanism 3', such shifting out of the neutral range position is detected by a 3" neutral position detector to generate an electrical signal to place the external power takeoff mechanism 3' and the connecting and disconnecting device 35 for traveling at inching speed inoperative position, instantly.

As can be clear from the above, the vehicle with the auxiliary traveling device according to the present invention can be driven either at the normal speed or the inching speed, selectively.

On the other hand, since normal traveling and work by the external work implement can be performed selectively, the vehicle can be driven to travel at inching speed while the external work implement is in operation.

Accordingly, with maintaining high revolution speed and high output of the traveling prime mover, continuous inching travel of the vehicle is permitted. Therefore, it becomes unnecessary to employ the expensive special vehicle installed with the multi-stage transmission which exhibits high speed traveling performance in normal traveling. On the other hand, it becomes possible to avoid necessity of installation of the dedicated prime mover, namely the working prime mover, separately from the traveling prime mover, resulting in high cost.

Namely, the vehicle with the auxiliary traveling device according to the present invention can easily perform necessary operation without sacrificing high speed traveling performance which the vehicle can achieve normally, and with maintaining high revolution speed and high output of the traveling prime mover at working site.

Furthermore, when the normal traveling primary power transmission is in neutral range position and the auxiliary traveling device is driven for driving the vehicle at inching speed, and the normal traveling primary power transmission is unwanted shifted out of the neutral range position, such shifting out of the neutral range position is detected by a not shown neutral position detector to generate an electrical signal to place the external power takeoff and the connecting and disconnecting device for traveling at inching speed inoperative position, instantly.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A vehicle with an auxiliary traveling device comprising:
    a power train including a primary power transmission for normal traveling, which is connected to a traveling prime mover for normal traveling, for transmitting a rotational torque of said traveling prime mover to driving wheels, through a rotary power transmission shaft, a drive shaft speed reducer and a drive shaft;
    an external power takeoff mechanism incorporated in said primary power transmission;
    a hydraulic pressure generator connected to an external power takeoff shaft of said external power takeoff mechanism;
    a hydraulically controlled power transmission for traveling at inching speed, which includes a hydraulic motor connected to said hydraulic pressure generator;
    said power train being active for enabling the vehicle to travel at a normal traveling speed while said primary power transmission for normal traveling is placed at a range position other than neutral range position,
    said auxiliary traveling device being operated for enabling travel at inching speed when said primary power transmission for normal traveling is placed at neutral range position, and
    when said primary power transmission for normal traveling is shifted out of said neutral range position, said external power takeoff mechanism and said hydraulically controlled power transmission for traveling at inching speed being made inoperative instantly in response to an electrical signal from a neutral position detector incorporated in said primary power transmission for normal traveling.

2. A vehicle with an auxiliary traveling device which travels at a normal traveling speed by transmitting a rotational torque of a traveling prime mover to driving wheels via a rotary power transmission shaft, a drive shaft speed reducer and a drive shaft while a normal traveling primary power transmission is in a range other than a neutral range, and performs a required work by transmitting the rotational torque of said traveling prime mover to an external work implement via an external power takeoff mechanism when said normal traveling primary power transmission is in said neutral range, comprising:
    said auxiliary traveling device being formed by connecting a hydraulic pressure generator to an external power takeoff shaft of said external power takeoff mechanism to be driven by said rotational torque of said traveling prime mover, and connecting a hydraulically controlled power transmission for traveling at inching speed to said rotary power transmission shaft, said hydraulically controlled power transmission for traveling at inching speed incorporating a hydraulic motor connected to said hydraulic pressure generator;
    said auxiliary traveling device being operated for enabling travel at inching speed in conjunction with operation of said external work implement when said primary power transmission for normal traveling is placed at neutral range position, and
    when said primary power transmission for normal traveling is shifted out of said neutral range position, said external power takeoff mechanism and said hydraulically controlled power transmission for traveling at inching speed being made inoperative instantly in response to an electrical signal from a neutral position detector incorporated in said primary power transmission for normal traveling.

3. A vehicle with an auxiliary traveling device comprising:
    a power train mechanism driving said vehicle to travel at a normal traveling speed by transmitting a rotational torque of a traveling prime mover to driving wheels via a rotary power transmission shaft, a drive shaft speed reducer and a drive shaft while a normal traveling primary power transmission is in a range other than a neutral range, and to transmit a rotational torque of said traveling prime mover to an external work implement via an external power takeoff mechanism and an external power takeoff shaft for implementing a required work when said normal traveling primary power transmission is in said neutral range;
    said auxiliary traveling device being formed by connecting a hydraulic pressure generator to an external power takeoff shaft of said external power takeoff mechanism to be driven by said rotational torque of said traveling prime mover, and connecting a hydraulically controlled power transmission for traveling at inching speed to said rotary power transmission shaft, said hydraulically controlled power transmission incorporating a hydraulic motor connected to said hydraulic pressure generator;
    said auxiliary traveling device being operated for enabling travel at inching speed in conjunction with operation of said external work implement when said primary power transmission for normal traveling is placed at neutral range position, and
    when said primary power transmission for normal traveling is shifted out of said neutral range position, said external power takeoff mechanism and said hydraulically controlled power transmission for traveling at inching speed being made inoperative instantly in response to an electrical signal from a neutral position detector incorporated in said primary power transmission for normal traveling.

4. A vehicle with an auxiliary traveling device as set forth in claim 1, wherein said hydraulically controlled power transmission for traveling at inching speed is constructed by extending a rotational power transmission shaft through a hydraulic vessel, on which the hydraulic motor is externally installed, connecting a first rotary power transmission shaft and a second rotary power transmission shaft with the rotary power transmission shaft at both ends, and assembling a connecting and disconnecting device for traveling at inching speed constituted of a first drive disc supported on the rotary power transmission shaft for free rotation with respect to the rotary power transmission shaft and a second drive disc fixed on the rotary power transmission shaft and operated for establishing and releasing connection by electrical signal or pneumatic pressure from a vehicular cabin.

5. A vehicle with an auxiliary traveling device as set forth in claim 2, wherein said hydraulically controlled power transmission for traveling at inching speed is constructed by extending a rotational power transmission shaft through a hydraulic vessel, on which the hydraulic motor is externally installed, connecting a first rotary power transmission shaft and a second rotary power transmission shaft with the rotary power transmission shaft at both ends, and assembling a connecting and disconnecting device for traveling at inching speed constituted of a first drive disc supported on the rotary power transmission shaft for free rotation with respect to the rotary power transmission shaft and a second drive disc fixed on the rotary power transmission shaft and operated for establishing and releasing connection by electrical signal or pneumatic pressure from a vehicular cabin.

6. A vehicle with an auxiliary traveling device as set forth in claim 3, wherein said hydraulically controlled power transmission for traveling at inching speed is constructed by extending a rotational power transmission shaft through a hydraulic vessel, on which the hydraulic motor is externally installed, connecting a first rotary power transmission shaft and a second rotary power transmission shaft with the rotary power transmission shaft at both ends, and assembling a connecting and disconnecting device for traveling at inching speed constituted of a first drive disc supported on the rotary power transmission shaft for free rotation with respect to the rotary power transmission shaft and a second drive disc fixed on the rotary power transmission shaft and operated for establishing and releasing connection by electrical signal or pneumatic pressure from a vehicular cabin.

7. A vehicle with an auxiliary traveling device as set forth in claim 4, wherein control for connecting and disconnecting of said first and second drive discs in the connecting and disconnecting device for traveling at inching speed is performed by an electrical signal from the vehicular cabin, and in response to shifting of said primary power transmission for normal traveling to the position other than the neutral range position during operation of the external power takeoff mechanism, the external power takeoff mechanism and the connecting and disconnecting device for traveling at inching speed inoperative position in response to an electrical signal from said neutral position detector incorporated in said primary power transmission for normal traveling, instantly.

8. A vehicle with an auxiliary traveling device as set forth in claim 5, wherein control for connecting and disconnecting of said first and second drive discs in the connecting and disconnecting device for traveling at inching speed is performed by an electrical signal from the vehicular cabin, and in response to shifting of said primary power transmission for normal traveling to the position other than the neutral range position during operation of the external power takeoff mechanism, the external power takeoff mechanism and the connecting and disconnecting device for traveling at are placed at an inching speed inoperative position in response to an electrical signal from said neutral position detector incorporated in said primary power transmission for normal traveling, instantly.

9. A vehicle with an auxiliary traveling device as set forth in claim 6, wherein control for connecting and disconnecting of said first and second drive discs in the connecting and disconnecting device for traveling at inching speed is performed by an electrical signal from the vehicular cabin, and in response to shifting of said primary power transmission for normal traveling to the position other than the neutral range position during operation of the external power takeoff mechanism, the external power takeoff mechanism and the connecting and disconnecting device for traveling at inching speed inoperative position in response to an electrical signal from said neutral position detector incorporated in said primary power transmission for normal traveling, instantly.

* * * * *